United States Patent
Shao et al.

(10) Patent No.: US 10,521,857 B1
(45) Date of Patent: Dec. 31, 2019

(54) SYSTEM AND METHOD FOR IDENTITY-BASED FRAUD DETECTION

(75) Inventors: Xuhui Shao, San Diego, CA (US); Jianjun Xie, San Diego, CA (US); Ted Dunning, San Diego, CA (US); Tao Hong, San Diego, CA (US); Joe Blue, Carlsbad, CA (US)

(73) Assignee: Symantec Corporation, Mountain View, CA (US)

( * ) Notice: Subject to any disclaimer, the term of this patent is extended or adjusted under 35 U.S.C. 154(b) by 3975 days.

(21) Appl. No.: 10/841,946

(22) Filed: May 7, 2004

Related U.S. Application Data

(60) Provisional application No. 60/469,865, filed on May 12, 2003.

(51) Int. Cl.
*G06Q 40/02* (2012.01)

(52) U.S. Cl.
CPC ................................. *G06Q 40/02* (2013.01)

(58) Field of Classification Search
CPC .. G06Q 20/4016; G06Q 20/401; G06Q 20/40; G06Q 20/4014; G06Q 50/265; G06Q 20/0855; G06Q 20/3674; G06Q 20/382; G06Q 20/4012; G06Q 10/063114; G06Q 20/108; G06Q 20/3552; G06Q 20/363; G06Q 20/3821; G06Q 30/0218; G06Q 30/0225; G06Q 30/0248; G06Q 30/0255; G06Q 30/0269; G06Q 40/02
See application file for complete search history.

(56) References Cited

U.S. PATENT DOCUMENTS

| | | |
|---|---|---|
| 5,361,201 A | 11/1994 | Jost |
| 5,418,951 A | 5/1995 | Damashek |
| 5,745,654 A | 4/1998 | Titan |
| 5,774,882 A | 6/1998 | Keen et al. |
| 5,794,178 A | 8/1998 | Caid et al. |
| 5,819,226 A | 10/1998 | Gopinathan et al. |
| 5,930,764 A | 7/1999 | Melchione et al. |

(Continued)

FOREIGN PATENT DOCUMENTS

| | | |
|---|---|---|
| WO | WO 99/56495 A1 | 11/1999 |
| WO | WO 01/35301 A1 | 5/2001 |
| WO | WO 01/77959 A1 | 10/2001 |

OTHER PUBLICATIONS

K. Bharat and M. R. Henzinger. Improved algorithms for topic distillation in a hyperlinked environment. In Proceedings of the 21st Annual International ACM SIGIR Conference on Research and Development in Information Retrieval, pp. 104-111, 1998.

(Continued)

*Primary Examiner* — Elda G Milef
(74) *Attorney, Agent, or Firm* — Holland & Hart LLP

(57) ABSTRACT

A method for determining a likelihood of fraud associated with an input identity record is disclosed herein. The disclosed method contemplates determining characteristics of the input identity record by examining content of one or more fields of the input identity record. Historical identity records related to the input identity record may then be retrieved so as to define a set of linked identity records. The method further includes computing one or more network-based features of the set of linked identity records. A fraud score may then be generated based upon the characteristics of the input identity record and the one or more network-based features.

29 Claims, 7 Drawing Sheets

(56) References Cited

U.S. PATENT DOCUMENTS

| | | |
|---|---|---|
| 6,038,555 A | 3/2000 | Field et al. |
| 6,094,613 A | 7/2000 | Ochi et al. |
| 6,095,413 A | 8/2000 | Tetro et al. |
| 6,173,275 B1 | 1/2001 | Caid et al. |
| 6,226,408 B1 | 5/2001 | Sirosh |
| 6,330,546 B1 | 12/2001 | Gopinathan et al. |
| 6,366,897 B1 | 4/2002 | Means et al. |
| 6,418,436 B1 | 7/2002 | Degen et al. |
| 6,430,539 B1 | 8/2002 | Lazarus et al. |
| 6,513,018 B1 | 1/2003 | Culhane |
| 6,597,775 B2 | 7/2003 | Lawyer et al. |
| 6,850,606 B2 * | 2/2005 | Lawyer ............ G06Q 10/00 379/114.01 |
| 6,974,079 B1 | 12/2005 | Strothmann et al. |
| 6,993,514 B2 | 1/2006 | Majoor |
| 7,234,156 B2 | 6/2007 | French et al. |
| 7,403,922 B1 * | 7/2008 | Lewis et al. ............ 705/38 |
| 2001/0001148 A1 | 5/2001 | Martin et al. |
| 2001/0001877 A1 | 5/2001 | French et al. |
| 2001/0011245 A1 | 8/2001 | Duhon |
| 2001/0047326 A1 | 11/2001 | Broadbent et al. |
| 2002/0029154 A1 | 3/2002 | Majoor |
| 2002/0083008 A1 | 6/2002 | Smith et al. |
| 2002/0099649 A1 | 7/2002 | Lee et al. |
| 2002/0155830 A1 | 10/2002 | Iyer |
| 2002/0161609 A1 | 10/2002 | Zizzamia et al. |
| 2003/0018558 A1 | 1/2003 | Heffner et al. |
| 2003/0041047 A1 | 2/2003 | Chang et al. |
| 2003/0208684 A1 | 11/2003 | Camacho et al. |
| 2004/0039686 A1 | 2/2004 | Klebanoff |
| 2004/0090439 A1 | 5/2004 | Dillner |
| 2004/0093261 A1 | 5/2004 | Jain et al. |
| 2004/0111359 A1 | 6/2004 | Hudock |
| 2004/0153663 A1 | 8/2004 | Clark et al. |
| 2005/0021476 A1 | 1/2005 | Candella et al. |
| 2005/0108063 A1 | 5/2005 | Madill, Jr. et al. |
| 2005/0144143 A1 | 6/2005 | Freiberg |
| 2006/0202012 A1 | 4/2006 | Grano et al. |
| 2006/0149674 A1 | 7/2006 | Cook et al. |
| 2007/0090181 A1 | 4/2007 | Varadarajan et al. |
| 2007/0129999 A1 | 6/2007 | Zhou et al. |

OTHER PUBLICATIONS

S. Chakrabarti, B. Dom, D. Gibson, J. Kleinberg, P. Raghavan, and S. Rajagopalan. Automatic resource compilation by analyzing hyperlink structure and associated text. Computer Network and ISDN Systems, 30:65-74, 1998.

Finding Groups in Data: An Introduction to Cluster Analysis, Leonard Kaufman, Peter J. Rousseeuw, ISBN: 0-471-87876-6, JW Wiley, 1990.

U.S. Pat. No. 5,819,226, Fraud detection using predictive modeling, Gopinathan, et al., Oct. 6, 1998 http://www.equifax.com/ and http://www.experian.com/.

Dictionary of Algorithms and Data Structures, Paul E. Black, http://www.nist.gov/dads/.

"Falcon™ ID, Your weapon in the fight against identity fraud," product literature from www.fairisaac.com, Sep. 2004.

Leonard Kaufman, Peter J. Rousseeuw, "Finding Groups in Data: An Introduction to Cluster Analysis," ISBN: 0-471-87876-6, JW Wiley, 1990.

http://www.equifax.com.

http://www.experian.com.

Non-final Office Action from U.S. Appl. No. 1149516 dated Apr. 16, 2009.

Final Office Action from U.S. Appl. No. 11/248,567 dated May 21, 2009.

Non-final Office Action from U.S. Appl. No. 11/026,552 dated Jan. 2, 2009.

* cited by examiner

SYSTEM AND METHOD FOR IDENTITY-BASED FRAUD DETECTION

CROSS-REFERENCE TO RELATED APPLICATIONS

This application claims priority under 35 U.S.C. § 119(e) to U.S. provisional application Ser. No. 60/469,865, entitled SYSTEM AND METHOD FOR IDENTITY-BASED FRAUD DETECTION, filed May 12, 2004.

FIELD OF THE INVENTION

The present invention relates to systems and methods for detecting and preventing the fraudulent acquisition and use of consumer accounts.

BACKGROUND OF THE INVENTION

Identity theft is currently one of the fastest-growing financial crimes worldwide. Reports indicate that up to 750,000 identities were stolen in the U.S. during 2001, which corresponds to up to 30 million stolen credit card, checking, telecommunications and other accounts. During this same year the direct losses accruing to credit and service grantors as a consequence of accounts created by means of identity theft has been estimated at over $3 billion in financial services and $35 billion across other vertical markets. Account "takeover", in which control of an account relationship is established through identity theft, is similarly on the rise.

Identity theft may be perpetuated in a variety of ways, but has recently been facilitated by the increasing prevalence of Internet-based transactions. Issuer's credit and debit card accounts, and associated identification information, are compromised daily on the Internet and that information is exchanged in public "chat rooms" for use by fraudsters. In particular, this identification and account information is accessible by fraudsters who scan the Internet for legitimate web sites employing sub-standard security measures. Once such sites are identified by fraudsters, they may be continually exploited through capture of all of the sensitive card and consumer identity information provided by consumers.

A number of commercial entities are involved in the business of attempting to limit credit card and other types of fraud related to identity theft. In general, the methods employed by these entities operate to expose potentially fraudulent transactions by determining that they are not in accord with established usage patterns of a particular card or account. Such usage patterns may be functions of, for example, geographic location, vendor, type of merchandise or service, and frequency of use. Use of these methods typically results in notification of a merchant or issuer only when there is a deviation from an established or predictable usage pattern.

Various proposed techniques to address fraud rely upon improved identification of known fraudulent names, fraudulent addresses, fraudulent phone numbers, fraudulent social security numbers, and other fraudulent personal information. These techniques are predicated upon the fact that a substantial percentage of number of fraud cases are perpetrated by repeat offenders or organized groups which utilize the same set of fraudulent personal information. In one such technique personal data known to be fraudulent is pooled in a central database. Applications for purchasing cards or other consumer accounts are then sent to the fraud database for inspection. The information on the application is then compared with the fraudulent information content within the database. If a match is identified, the merchant is alerted that an attempted fraud may be occurring. Unfortunately, these types of "matching" systems may exhibit a proclivity of generating "false positives" and inappropriately warning merchants of potential fraudulent acts. This is because while certain information within an application submitted by a merchant may match information within the database known to have been fraudulently used, an alert is generally sent to the merchant even if other portions of the merchant application are not identified as corresponding to such fraudulent information. That is, the reliability of the match is typically not determined, nor is an indication of such reliability provided to the merchant. Unfortunately, the likelihood of generating a false positive match and sending a corresponding alert to the applicable merchant indication is increased in the absence of such reliability information.

SUMMARY OF THE INVENTION

In summary, the present invention relates to a method for determining a likelihood of fraud associated with an input identity record. The inventive method contemplates determining characteristics of the input identity record by examining content of one or more fields of the input identity record. Historical identity records related to the input identity record may then be retrieved so as to define a set of linked identity records. The method further includes computing one or more network-based features of the set of linked identity records. This permits a fraud score to be generated based upon the characteristics of the input identity record and the one or more network-based features.

The present invention is also directed to a method for determining a likelihood of fraud associated with an input identity record included within a stream of input identity records. The method includes processing the input identity record using a sequence of filters configured to examine, without reference to historical identity record information, the content of one or more fields of the input identity record in order to determine nodal features of the input identity record. Historical identity records linked to the input identity record by a common identity-related parameter are then retrieved so as to define a set of linked identity records. The method further includes computing one or more network-based features of the set of linked identity records. This enables generation of a fraud score and associated reason codes based upon the nodal features and the one or more network-based features.

In another aspect, the present invention relates to an identity record processor disposed to determine a likelihood of fraud associated with an input identity record. The identity record processor includes one or more identity record filters configured to determine characteristics of the input identity record by examining content of one or more fields of the input identity record. An arrangement is also provided for retrieving historical identity records related to the input identity record, typically by way of a common identity-related parameter, so as to define a set of linked identity records. The processor further includes a network-based features module capable of computing network-based features of the linked identity records. A scoring module is provided for generating a fraud score based upon the characteristics of the input identity record and the network-based features.

Another aspect of the invention is directed to a fraud detection center disposed to determine likelihood of fraud associated with input identity records. The inventive fraud detection center includes one or more identity record portals for receiving the input identity records from client institutions and for returning return identity records with the input identity records to the client institutions, each of the return identity records including a fraud score. An identity record pool, in communication with the one or more identity record portals, is configured to store ones of the input identity records. The fraud detection center further includes a plurality of identity record processors operative to generate the return identity records on the basis of corresponding ones of the input identity records. At, least one of the plurality of identity record processors is operative to utilize, in connection with generating corresponding ones of the return identity records, historical identity records from a database of historical identity records related to the input identity records.

The invention is directed in another aspect to a method for determining a likelihood of fraud associated with an input identity record. The method includes retrieving historical identity records related to the input identity record so as to define a set of linked identity records. One or more network-based features of the set of linked identity records are then computed. The method further includes generating an indication of the likelihood of fraud based upon the one or more network-based features and fraud indicators respectively associated with the historical identity records.

In yet another aspect the present invention relates to a method for determining a likelihood of fraud associated with an input identity record which is premised upon evaluating the relative sizes of fuzzy clusters of identity records related to the input identity record. The method includes retrieving historical identity records related to the input identity record so as to define a set of linked identity records. The method further includes determining a first number, or "cluster size", of the linked identity records which have values of a selected identity field bearing a predefined relationship to a first threshold. Also determined is a second number of the linked identity records having values of the selected identity field bearing a predefined relationship to a second threshold. A likelihood of fraud is then estimated by comparing or otherwise evaluating the cluster sizes associated with the first and second thresholds. Additional cluster sizes associated with other thresholds may also be determined and considered when estimating such likelihood of fraud.

The present invention also relates to a method of maintaining historical identity-related information in a manner enabling efficient computation of identity-related patterns inherent within such information. The method includes representing a set of historical identity records as an adjacency matrix. Consistent with the invention, the adjacency matrix is representative of links between ones of the historical identity records wherein the links are indicative of the existence of a predefined relationship between the values of identity fields defined by ones of the historical identity records. The adjacency matrix is then decomposed into a plurality of sub-matrices respectively associated with different ones of the identity fields, each of the sub-matrices being represented as a sorted file and an associated index file.

The present invention is also directed to a method of identifying ones of a set of historical identity records containing identity-related information similar to identity data defined by an input identity record used within a fraud detection system. The method includes representing the set of historical identity records as an adjacency matrix. Consistent with the invention, the adjacency matrix is representative of the existence of a predefined relationship between the values of identity fields defined by ones of the historical identity records. The method further includes decomposing the adjacency matrix into a plurality of sub-matrices respectively associated with different ones of the identity fields, each of the sub-matrices being defined by (i) an identity record file containing a set of sequence numbers identifying the set of historical identity records wherein each identity record file is sorted as a function of the applicable one of the identity fields and (ii) an associated index file. A first of the associated index files is then accessed in order to obtain a first offset corresponding to a value of a first identity field of the input identity record. One or more of the sequence numbers are then retrieved from a first of the identity record files corresponding to the first of the associated index files.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

System Overview

Figure 1:
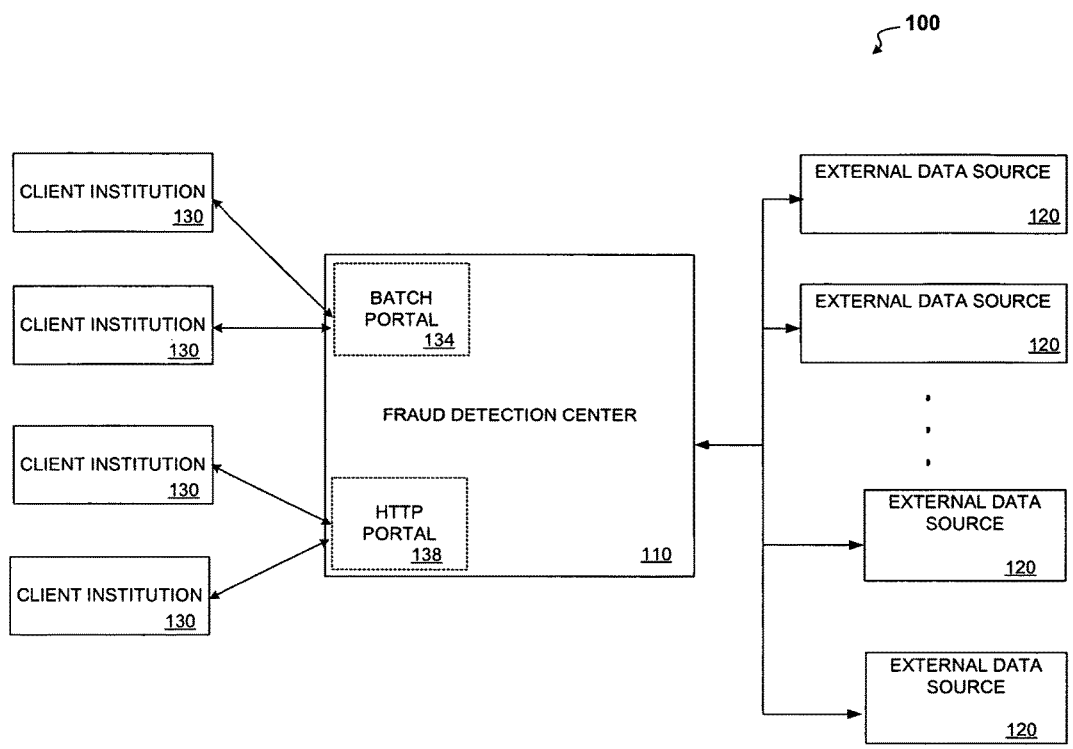
FIG. 1 depicts a fraud detection system which includes a fraud detection center configured to implement identity-based fraud detection in accordance with the present invention.

The present invention is directed to a system and method for determining a likelihood of identity-related fraud associated with various types of activities and transactions (e.g., applying for credit). In an exemplary embodiment of the invention fraud detection is effected using a set of techniques based upon Graph Theoretic Anomaly Detection (GTAD), which provides a general methodology for building inferential models using large-scale graph-structured data. Use of this approach enables suspicion of fraud or lack thereof to be propagated through a graphical network of related identity records in a computationally-feasible manner, thereby providing a basis for subsequent fraud detection analysis. In accordance with one exemplary embodiment of the invention, anomaly detection techniques are used in identifying features of the graphical network potentially useful in evaluating the probability that a given identity record is fraudulent. These techniques have proven to be efficient and effective even though the number of possible useful features of a given graphical network will generally be immense, and even though it will typically be infeasible to explicitly construct a set of mathematical structures describing such graphical network.

The inventive system is disposed to operate upon an incoming stream of input identity records, each of which contains one or more identity-related fields. In response to each input identity record, the inventive system generates a return identity record containing a numerical "fraud score" indicative of the likelihood that the input identity record is fraudulent together with a set of "reason codes" related to the score. Specifically, the reason codes comprise discrete indicators of the factors likely contributing to the fraud score, and may be used to guide a fraud investigator in determining whether an identity record is actually fraudulent.

Each input identity record is generally created on the basis of some action taken by an individual consumer other than initiation of a monetary transaction. For example, input identity records may comprise credit applications, existing account status (e.g., account holder identity information), account status changes, or account payment records. Typical account status changes may include, for example, changes in identity elements such as address or phone number. Account status changes may also result from modification of the limits of existing credit lines, authorization of new users in connection with existing credit accounts, and issuance of additional physical credit cards. Common to each input identity record are one or more identity-related fields such as name, address, social security number, home and work phones, IP address, email address, originating telephone number.

As is described in further detail below, the incoming stream of input identity records is first processed by a sequence of filters configured to examine the content of various fields of each input identity record in order to determine various characteristics of the identity record (e.g., whether the given phone and social security numbers are valid, and whether the given phone number is for a mobile phone). These characteristics of the input identity record may be determined without reference to any historical identity record data, and result in generation of a set of "nodal features" characterizing the input identity record. Subsequent to the computation of these nodal features, all historical identity records that are linked to the current identity record by a common identity-related parameter (e.g., a shared name or address) are retrieved from a database of historical identity records. Various statistical summaries, or "network-based features", of the resultant graphical network of related identity records are then computed. Once sets of nodal and network features have been determined, combinations of these features termed "meta-features" may also be computed. Finally, some or all of the nodal features, network-based features and meta-features associated with the input identity record may be utilized in generating the fraud score and reason codes for the identity record.

Turning now to FIG. 1, a fraud detection system 100 includes a fraud detection center 110 configured to implement identity-based fraud detection in accordance with the present invention. The fraud detection center 110 may utilize information provided by various external data sources 120 of the type described below in connection with validating or otherwise processing input identity records received from various client institutions 130. As mentioned above, a fraud score and associated reason codes are provided to the applicable client institution 130 in response to each such input identity record. In exemplary embodiments the fraud detection center 110 is capable of responding to input identity records in substantially real-time through either a batch portal 134 or an online HTTP-based portal 138.

The external data sources 120 may be operated by, for example, credit/debit card issuers, credit bureaus, the U.S. Postal Service, the Social Security Administration, the Department of Motor Vehicles, and telecommunications carriers. The type of identity-based data obtained from the sources 120 may include, for example, name, address, social security number, home and work phone numbers, and email address. Potential client institutions 130 may include, for example, credit-granting entities such as bank and non-bank card issuers of purchasing cards, merchants, utility companies and telecommunications carriers.

Figure 2:
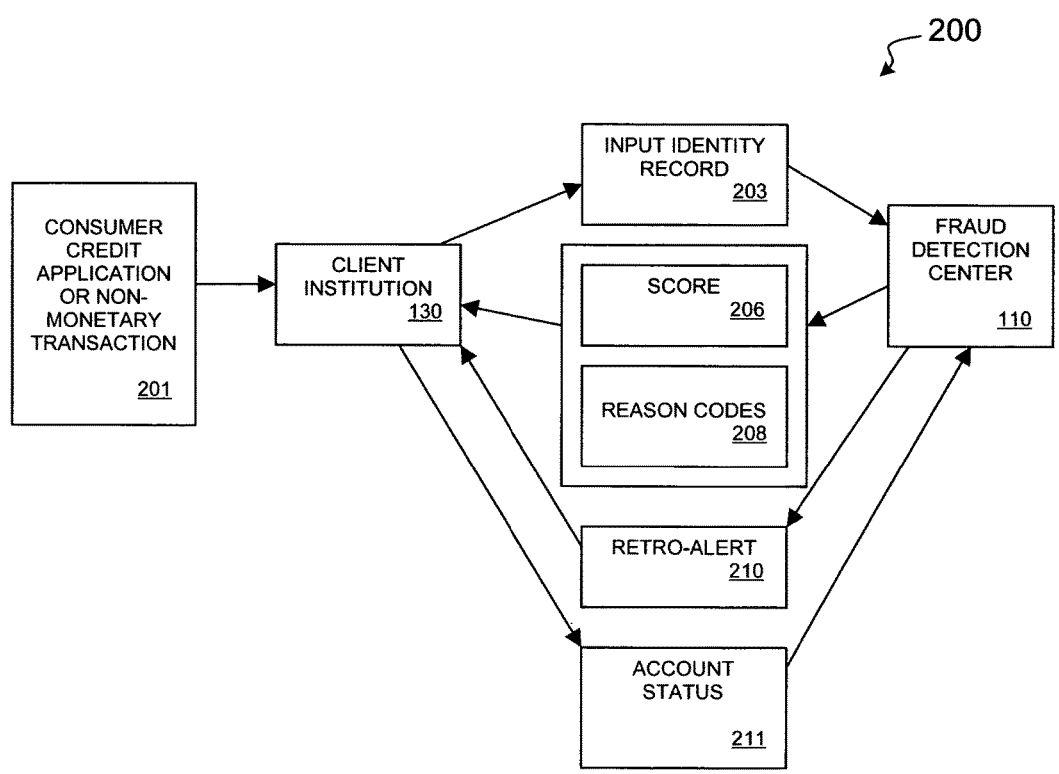
FIG. 2 shows a process flow diagram representative of the manner in which input identity records are processed by the fraud detection center of FIG. 1 in accordance with the invention.

Referring to FIG. 2, there is shown a process flow diagram 200 representative of the manner in which input identity records are processed by the fraud detection center 110 in accordance with the invention. As noted above, each input identity record is generally created on the basis of some action taken by an individual consumer other than initiation of a monetary transaction (e.g., completion of a consumer credit application), although the teachings of the present invention are equally applicable to detecting fraudulent monetary-based transactions. Common to each input identity record are one or more identity-related fields such as name, address, social security number, home and work phones, IP address, email address, and originating telephone number. As is discussed below, the sophisticated capability of the present invention to detect identity-related fraud even at the application stage of the account creation process is believed to represent a significant advance over existing fraud detection schemes, and is expected to substantially reduce fraud-related losses when implemented.

The completed credit application or other non-monetary identity record 201 is received from the consumer by the applicable client institution 130. In general, each input identity record 203 provided to the fraud detection center 110 is comprised of only an extract of the information contained within each identity record. As is discussed below, the fraud detection center 110 then evaluates each received input identity record 203 and computes an associated statistically-based probability of fraud. This probability is represented by a fraud score 206. In the exemplary embodiment this fraud score 206, and reason codes 208 describing an underlying rationale for the score 206, are retuned to the client institution 130 so that additional identity information can be sought from the consumer initiating the request 201.

As is discussed below, the fraud detection center 110 may utilize information from other credit applications and other identity records sharing common identity-related information with the input identity record 203 currently under evaluation. Moreover, additional credit applications and other identity records linked to a given input identity record 203 on the basis of common identity-related information may be received (typically via a number of different channels) by the fraud detection center 110 even after a corresponding score 206 has been provided to the requesting client institution 130. In certain cases consideration of this additional information may appreciably increase the level of fraud-related suspicion attaching to the previously-processed identity record 203. In such event, an additional return value 210 or "retro-alert" may be communicated to the requesting client institution 130. Such a retro-alert 210 may be issued one or more days following generation of the original score 206 and would include an explanation as to the manner in which the circumstances surrounding the original input identity record 203 have changed. This may be helpful in situations where the initial decision as to the original score 206 was required to be made substantially instantaneously, but in which there also exists a delay between consummation of the requested identity record 201 with the consumer (e.g., establishment of a credit card account in response to submission of a credit card application, shipment of goods in response to a purchase order, or provision of requested services). In such case the issuance of a retro-alert 210 may reduce or eliminate fraud-related losses to the extent received prior to the completion of performance in response to the requested identity record 201.

The client institution 130 may be configured to periodically send updates concerning the status 211 of all its accounts to the fraud detection center 110 in order to enable the evolution of such accounts to be tracked over time. This facilitates the subsequent detection of other fraudulent identity records related by the similar use of one or more identity-related elements (e.g., name, telephone number or address).

Figure 3:
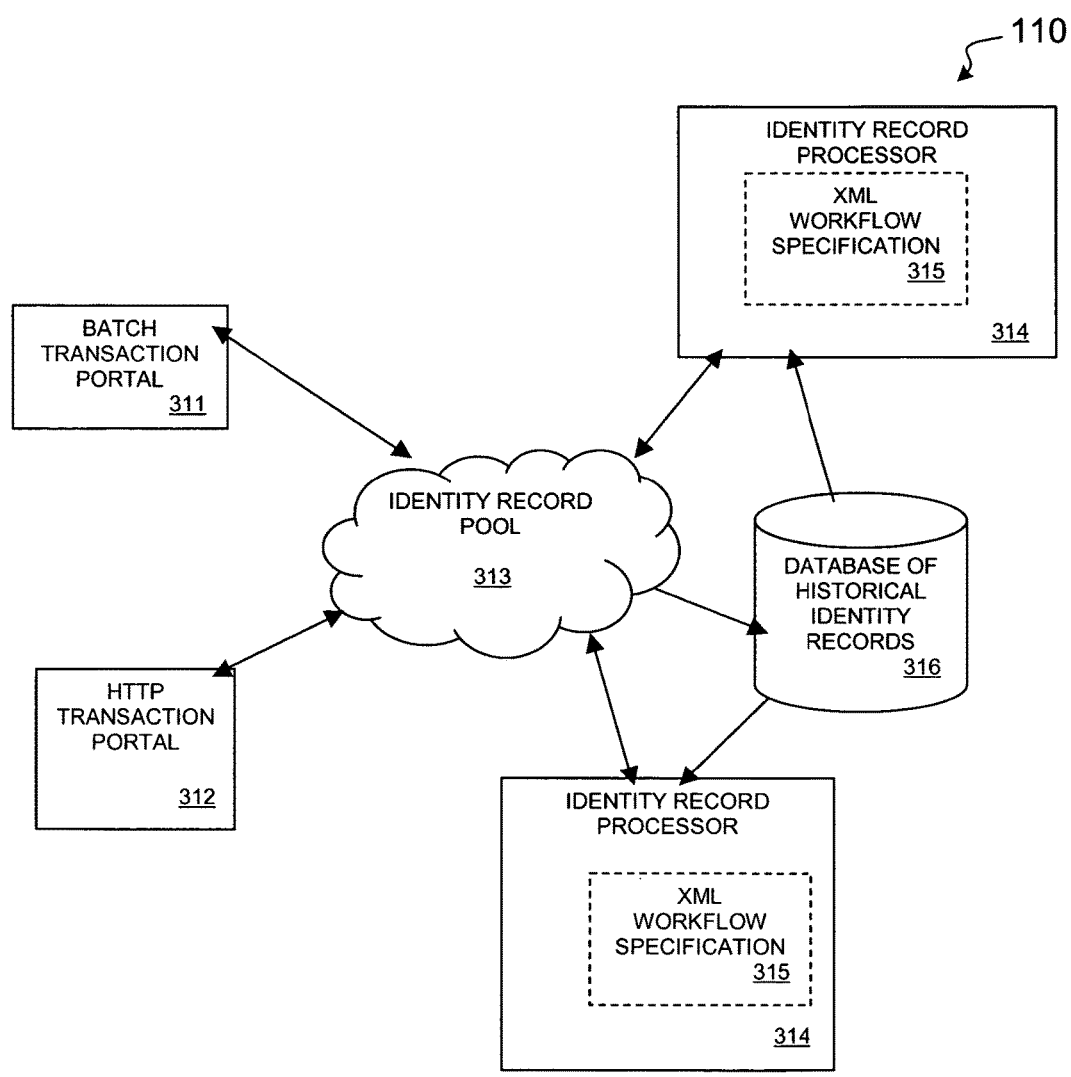
FIG. 3 provides a high-level representation of the fraud detection center of FIG. 1.

Turning now to FIG. 3, a high-level representation is provided of the fraud detection center 110. As shown, the fraud detection center 110 includes a batch transaction portal 311 and an HTTP transaction portal 312. The batch transaction portal 311 accepts input identity records via batch files from the client institutions 130, while the HTTP transaction portal 312 receives input identity records from the client institutions 130 via a Web connection. Each transaction portal 311, 312 reformats received input identity records into a predefined internal format and rejects malformed input identity records. After being placed in the appropriate internal format, each input identity record is accorded a sequence number used for tracking purposes and is passed to an identity record pool 313. Once an identity record has been placed within the identity record pool 313, it is retrieved from the pool 313 by one of a plurality of identity record processors 314 on the basis of one or more of its characteristics (e.g., client ID, requested action, record priority and so on). The identity record processor 314 which removes a given identity record from the identity record pool 313 is configured to compute, in the manner described herein, statistical estimates of the probability of fraud associated with the identity record. In addition, as a result of this computation the identity record processor 314 also generates a summary of actions likely to be useful in verifying whether the identity record is, indeed, fraudulent.

The computation effected by each identity record processor 314 with respect to a given input identity record is carried out in accordance with an associated XML-based workflow specification 315, which contains a description of all of the steps necessary to perform the computation. During this computation, reference may be made to a database of historical identity records 316 in order to determine whether any previously processed identity records have similar characteristics as the current identity record. Such similarity between characteristics (e.g., identity-related characteristics such as name or telephone number) of the current identity record and various previous identity records establishes links to such previous identity records. Consistent with the invention, these links form a portion of a large network or graph that is used to evaluate the likelihood of the current identity record being fraudulent.

Upon completion of the computation performed in response to an input identity record, the identity record processor 314 generates a corresponding return identity record and delivers it to the identity record pool 313. The return identity record is then communicated, via the same transaction portal 311, 312 through which the corresponding input identity record was received, to the client institution 130 from which such input identity record was received. Again, each return identity record includes a fraud score indicative of the likelihood that the input identity record is fraudulent together with a set of reason codes related to the score. After the results are returned, an off-line process (not shown) collects all identity records processed through the identity record pool 313 and updates the historical identity record database 316. This off-line process is typically performed after enough identity records have been processed to make the amortized cost of merging the new identity records into the historical database 316 sufficiently small. Since rebuilding the historical identity record database 316 may generally be done relatively quickly (i.e., within a few hours), in the exemplary embodiment this merger process typically occurs every few days.

Modeling Infrastructure

As is described in further detail below, the identity record processors 314 operate upon an abstract data type referred to hereinafter as a record. In particular, each identity record within the identity record pool 313 is associated with a record having multiple fields, each of which is identified by name. In the exemplary embodiment each field contains a Java object utilized in computing the fraud score 206 ultimately associated with each input identity record. As the computation of the score 206 progresses, new fields are defined in order to contain the results of computations applied to previously-existing fields or the results of queries to the historical identity record database 316. In this way each record provides a basis for computing a statistically-based prediction of the probability of fraud associated with a given input identity record.

Abstract Record Datatype

The abstract record datatype provides a framework around which all modeling or "fraud prediction" computations are structured. Multiple implementations of the abstract record are available, but all provide the ability to define, access and modify fields in the record by name. Records are relatively lightweight data structures and can thus be created and destroyed without substantial performance penalty. Generally, the values of the fields within the records are strings or floating point numbers, but in a few well defined situations such as link analysis, fields contain values that are themselves container types such as a java.util.List of records. Where possible, type specific accessors are used. These accessors provide data conversions where appropriate.

Records containing only primitive types such as strings or numbers can be read from databases or files using a number of formats. Subsets of the fields in a record can be written to databases or files using the same format conversions.

Dataflow Architecture & Computation

As mentioned above, each record contain fields capable of storing intermediate values used by the applicable identity record processor 314 in computing the score 206 and reason codes 208 associated with a respective input identity record. Each step of the computation is implemented by a Java class that operates on certain named fields and produces one or more other field values. The general convention for structuring a computation step is described by the Java interface com.ida.dataAccess.Filter. In general, such a filter is responsible for accepting records from its input, transforming each of them as necessary, and providing the transformed values on request. The input of each such filter comprises either a sequence of records corresponding to an input stream of raw identity records, or the sequence of records output by the filter implementing the previous computational step.

Multiple implementations of this dataflow architecture are possible and each different implementation will result in different control flow properties or other characteristics. For example, the data flow specified by the applicable XML workflow specification 315 may define the connection of Java objects that pass the progressively-elaborated record data structures described above using direct method invocation or via an interpreter. Since the processing of the record data structure corresponding to one input identity record cannot in principle affect the processing associated with another identity record, this same data flow could be implemented using multiple threads for higher performance on multi-processor hardware.

Each XML workflow specification 315 uses XML in specifying all options for the filters of a given dataflow as well as the sequence in which such filters are implemented. The use of XML permits dataflows of substantially different complexities to be specified in a similar fashion. The level of complexity of the specification 315 may be quite low if only a few instance variables require initialization, but may be quite complex if an elaborate specification must be parsed and a complex data structure created.

In general, each XML workflow specification 315 defines two types of dataflow. A first type of dataflow specifies the origins of input identity records and the ultimate destination of such identity records, while a second type of dataflow lacks this origin and destination information. This first type of dataflow is useful when processing a large batch of file-based identity records, such as in connection with the evaluation of fraud prediction models using test files containing previously-defined identity records. The second type of data flow is utilized in situations where the input and output are implicit. For example, in embodiments of the invention suitable for commercial implementation, the identity record processors 314 are charged with removing identity records from the identity record pool 313 and returning these identity records to the pool 313. In this case, the dataflow necessarily has little or no knowledge of how identity records are to be removed from or returned to the pool 313. Another example of such a "headless" dataflow is in the thread filter which invokes multiple threads to perform a number of computational steps on records in parallel.

The following example is a dataflow that illustrates how multiple files may be read using a business specific data input class clients.SuperBankDataReader, sampled by the Sampler class and then averaged by the Averager class before the output is produced by the CSVWriter class.

```
<dataflow>
    <reader class="com.ida.clients.SuperBankDataReader">
        <fileSet> Super??.dat </fileSet>
        <file> ExtraDataFile.dat </file>
    </reader>
    <filter class="Sampler" rate="10/1000"/>
    <filter class="Averager"/>
    <writer class=" CSVRecordWriter"
            delimiters=',"' file="fooble.csv"/>
</dataflow>
```

Task Workflow

The workflow architecture implemented by each identity record processors 314 supports the coordination of multiple tasks. Specifically, certain individual tasks are not initiated until one or more related predecessor tasks have been completed, and record data structures may be passed from one task to another. Currently-defined tasks include a shell scripting language similar to Java that is known as "bean shell" (see, e.g., http://www.beanshell.org/ for information concerning the underlying interpreter). The currently defined tasks further include self-contained dataflows which specify their own identity record sources and sinks, as well as a identity record processor operative to connect a dataflow to an identity record pool in manner described with reference to the identity record processor 314 of FIG. 3. The workflows implemented by each identity record processor 314 provide the mechanism by which fraud detection model evaluation (as described by a dataflow) is connected with the applicable identity record pool.

Generally, workflows are used to sequence initialization tasks that involve reading of large tables of weights or connecting to databases (e.g., the historical identity record database 316 and external data sources 120) so that these tasks conclude before actual identity record processing begins. During model training or evaluation (i.e., actual computation of a fraud probability), the final task in the workflow is a "dataflow" task that contains a dataflow with a specified identity record source and sink. In practical server implementations, the final step in the workflow is a "processor" task that contains a headless dataflow. The processor task invokes a number of worker threads that retrieve identity records from the identity record pool, processing them using the specified dataflow and returning the results to the identity record pool.

The following example illustrates the manner in which a workflow may be specified. In this case the jobs "foo" and "foo2" are prerequisites to the job "fob". These prerequisite jobs will be run either in parallel or in sequence according to the unspecified implementation of the workflow engine. Upon completion of the job foo, the job fob will be started and will be provided with the output from job foo. The details of each job are of no interest to the workflow system, only the sequencing of the operation of the jobs and the coordination of their input and output data structures.

```
<workflow>
    <job name="foo">
        <produces> z </produces>
        <dataflow
            ...
        </dataflow/>
    </job>
    <job name="foo2">
        <dataflow>
            ...
        </dataflow/>
    </job>
    <job name="fob">
        <produces> model </produces>
        <dependsOn> foo.z </dependsOn>
        <dependsOn> foo2 </dependsOn>
        <dataflow>
            ...
        </dataflow/>
    </job>
</workflow>
```

Identity Record Processing Data Flow

Figure 4:
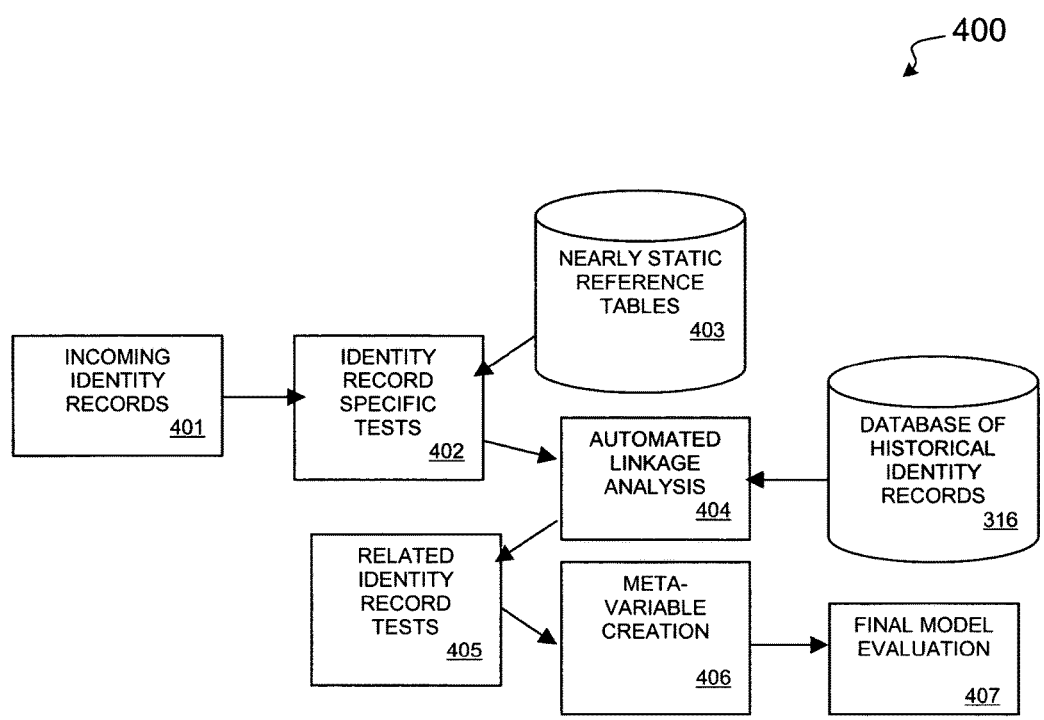
FIG. 4 illustratively represents a model data flow representative of the processing of input identity records within an identity record processor incorporated within the fraud detection center of FIG. 1.

FIG. 4 illustratively represents a model data flow 400 representative of the processing of input identity records within one of the identity record processors 314 pursuant to the applicable XML-based workflow specification 315. In the exemplary embodiment the model data flow of FIG. 4 may be implemented using the dataflow and record data structures described above. As shown, a stream of incoming identity records 401 is first processed by a sequence of filters operative to examine each input identity record for the presence of various characteristics potentially predictive of the likelihood of fraud (step 402). For example, the filters may determine whether various identity-related parameters (e.g., social security number, address and telephone number) included within the input identity record are valid. The filters may also identify the type of real estate (e.g., commercial establishment, apartment dwelling or single family residence) corresponding to any address information within the input identity record, and determine whether any telephone numbers within the input identity record are for wireless phones. As a result of the processing effected by the filters, a set of characteristics of the input identity record are produced. These characteristics or "nodal features" may be determined using various tables and databases 403 and without reference to any historical identity record data.

Subsequent to computation of the nodal features of a current input identity record, all prior identity records recorded within the historical identity record database 316 that related to the current input identity record by way of a shared identifying characteristic (e.g., name, address, social security number, telephone number or the like) are retrieved from the historical identity record database 316 (step 404). In the case of identity records potentially linked by non-numerical identity information (e.g., name or address), all identity records containing approximately matched non-numerical identity information are retrieved from the database 316. In certain embodiments pragmatism may dictate that the size of the retrieval be limited to on the order of a thousand related identity records. This limit will generally be set sufficiently large to ensure that characteristics or values derived from a random subset of the complete set of linked identity records will be approximately the same as corresponding characteristics or values derived from such complete set. In embodiments in which each input identity record is represented as a record (described below), the set of linked identity records are stored within the record being processed such that one field is devoted to each kind of linkage.

Various statistical summaries of the linked identity records retrieved from the historical identity record database 316 may then be computed (step 405). These statistical summaries, or "network-based features", may range in complexity from raw counts to graphical representations of metrics based upon previously-computed intermediate values stored within the database 316. These statistical summaries may be computed in a variety of ways, such as directly in Java or through a headless dataflow of the type described below.

It is noted that the network-based features characterizing a given input identity record will not necessarily exclusively depend upon the set of related identity records retrieved from the historical database 316 in the manner described above. This is because the features examined in these related identity records may themselves comprise network-based features, which creates the possibility of potentially unbounded regress; that is, it is conceivable that a given network-based feature could potentially be a function of all directly or indirectly linked nodes. Details relating to computation of such nested or recursive network functions are provided below. The only practical constraint on this function is that the intermediate values on the related identity records must be stored in a finite and relatively small amount of space. There is a theoretical constraint in that the linkages established within the historical identity record database 316, combined with the order in which the intermediate values stored by the records for related identity records are computed, enforce the limit that the historical identity record database 316 forms a directed acyclic graph. This is generally acceptable as the directed acyclic nature of this graph simply reflects normal physical causality.

Once all nodal and network features have been computed, combinations of these features (hereinafter "meta-features") may then be computed (step 406). A primary purpose for meta-features is to introduce non-linearity into otherwise linear decision models. Another purpose is to make certain features more accessible to certain modeling techniques such as the expansion of a categorical feature into multiple binary features. Finally, all available features can be combined into an output score and reason codes (step 407). A variety of machine learning technologies may be used to effect this final computation including, for example, artificial neural networks or decision trees.

One advantageous feature of the fraud detection modeling process of the invention is that statistically-based fraud probability computations (i.e., model evaluation) proceed without creating a profile. This is in contrast to the approach taken in conventional transaction-based fraud systems, or matching to a known identity as is done in credit scoring systems. Profiles and identity matching are ineffective against identity theft precisely because they depend on characteristics that identity thieves purposely obfuscate. Profile-based techniques depend on accurate identification of the incoming request with an existing profile and are ineffective when either identification fails or when no existing profile has sufficient depth. Identity matching is performed in credit scoring systems because identity thieves have access to the identifying information of victims and thus can successfully masquerade as the victim.

The process of evaluation described above will generally be effected both during real-time operation of a completed fraud detection model, as well as during model development. One advantage of the inventive fraud detection architecture and implementation described herein is that very high throughput is possible during model development. This enables testing of a much larger set of potential features for relevance to a given fraud detection problem. Testing a larger variety of potential features permits model developers to gain a better intuitive understanding of the problem and broadens the scope of the search for appropriate inputs. This advantageously leads to substantially improved fraud detection performance.

Nodal Variables

Verification Features

A number of verification features may be derived directly from the input identity record data received at the fraud detection center 110. For instance, home or office address information may be examined in order to determine whether the address in question corresponds to a valid address, an apartment, a post office box, a mail drop facility, a correctional facility, or a campground. Likewise, telephone numbers may be examined in order to determine whether they address a mobile phone, land line or pager. Social security numbers may also be checked to see whether they are valid, as well as when and where they were issued.

Time-Based Variables

Time-based variable such, as time-based nodal features, are useful in characterizing the age of an associated identity record. Such a characterization permits a time-based function to be applied to the identity record during the fraud detection process. Specifically, the effect of a known fraud may be decreased over time by computing a meta-variable comprised of a combination of a fraud indicator (described below) characterizing the fraud and a monotonically decreasing function of time. In the exemplary embodiment each time-based nodal variable may be expressed in either of the two forms: (a) the identity record is t seconds old, or (b) the identity record occurred before/after time t. Time-based variables may also be combined to form network-based velocity variables.

Risk Tables

Risk tables are generally realized as lookup tables used to convert a categorical feature into a continuous variable. Typically, the categorical feature to be converted will be a function of a categorical variable or parameter capable of assuming a large number of potential values. For example, the categorical feature "home zip code" could be defined with respect to a categorical variable comprised of the first three digits of the home zip code of the identity record of interest. The value assigned to a particular categorical feature will generally be determined by empirical observation of previous fraud rates in identity records associated with particular values of the applicable categorical variable.

Fraud Indicators

A previous identity record recorded within the historical identity record database 316 may be marked with any of a number of indicators indicative of the likelihood that the identity record is fraudulent. Generally, a trade-off exists between the accuracy of an indicator (i.e., the percentage of marked identity records that are in fact fraudulent) and coverage of the indicator (i.e., the percentage of all identity record marked as fraudulent). An inverse relationship also generally exists between the accuracy of an indicator and the length of time elapsed prior to applying a fraud indicator to an identity record within the database 316. For example, immediately marking all identity records accorded a fraud score in the upper decile with a fraud indicator would identify most fraudulent identity records and be very timely, but would likely incorrectly mark many legitimate identity records as fraudulent. Conversely, waiting until a written fraud affidavit is received from a consumer prior to marking identity records as fraudulent would result in very high accuracy at the expense of timeliness and coverage. In certain embodiment multiple indicators may be used and the empirically observed trade-off between age, coverage and accuracy may be used to weight the various indicators. By their nature, fraud indicators are typically only used as components of network-based features. Several exemplary fraud indicators are described in Table I.

TABLE I

| Feature of Identity record | Timeliness | Accuracy | Coverage |
| --- | --- | --- | --- |
| High computed fraud score | Instant | High | Low |
| Moderate computed fraud score | Instant | Low | High |
| Early high balance | 1 month | Low | High |
| Early high balance with one or more payments missed | 2 months | Moderate | High |

TABLE I-continued

| Feature of Identity record | Timeliness | Accuracy | Coverage |
| --- | --- | --- | --- |
| Early high balance with n or more payments missed | n + 1 months | High | High |
| Investigator classifies case as fraud after attempted verification | >2 months | High | Low |
| Fraud affidavit received | >6 months | High | Very low |

The particulars of the business involving the applicable identity record will affect the relationship between the timing, accuracy and coverage of the indicators described in Table I. For example, in certain business environments the costs associated with fraud investigation may be sufficiently high that it is only very infrequently worthwhile to pursue the acquisition of a fraud affidavit. As a consequence, the true coverage of fraud affidavits in these business environments is even narrower than is indicated above. Similarly, in a very high threat environment, even a moderately high computed fraud score may simultaneously achieve acceptably high accuracy and coverage.

Network-Based Features

The set of all historical identity records form multiple graphs $G_\chi=(N,A)$, where N corresponds to a set of nodes (i.e., a "nodeset") representative of the set of all identity records and where A corresponds to a set of edges ("edgeset") composed of pairs of nodes sharing a common identity-related characteristic $\chi$ (e.g., name, social security number or telephone number). An edge may even appear when the common characteristic is not exactly duplicated, but is at least substantially similar, at each node. All of the graphs $G_\chi$ may be combined into a single labeled graph G. As mentioned above, embodiments of the invention are effected using a set of techniques based upon Graph Theoretic Anomaly detection, and the graphs G and $G_\chi$ form the basis for such detection.

Any graph G' with nodeset $N' \subset N$ and edgeset $E'=\{(n_1, n_2) | n_1 \in N' \wedge n_2 \in N'\} \subset E$ that is a valid subset of the edges in G is known as a sub-graph of G. The distance between two nodes is the number of edges that must be traversed to get from one node to the other. The neighborhood of radius r around a node n is the set of nodes that are at most r steps from n. In accord with the invention, all of the graphs G and $G_\chi$ will be directed acyclic graphs since links within the inventive network of linked identity records are inherently directed from new identity records to older ones.

Determining a value of a given network-based feature involves computing a function $f$ of the values of nodal or networked features for all identity records in the single-step neighborhood of the original identity record in some graph $G_\chi$. The network-based feature is completely specified by choice of function $f$ and graph-defining characteristic $\chi$. The value of the function $f$ typically corresponds to the number of identity records possessing a characteristic having a value bearing a predefined relationship (e.g., greater than) to a particular threshold, or the sum of the values of characteristics for the linked identity records. In more sophisticated embodiments, the value of a network-based feature may be determined by estimating the volume of a sub-graph of a certain radius centered upon the current identity record. These more advanced embodiments may use functions which depend on having previously recorded the value of some other network function at all identity records in the neighborhood. If function $f$ is defined by referring to the recorded value of function g, then the value of $f$ will inherently depend on nodes within a "two-step" radius neighborhood rather than just the single-step radius neighborhood. This composition may be repeated to any desired depth, and may also involve recursive use of $f$. Thus, if $f$ computes the union of the values of g in the neighboring nodes and g is the set of neighbors, then $f$ computes the set of nodes within two steps of the current identity record. An approximate value can be had by using a fixed-size surrogate for the sets (e.g., a hashed bit-set).

Each network-based feature may be classified based upon two key characteristics; namely, (i) whether it is locally or distally-centered, and (ii) the number of intermediate values it requires be maintained. Locally-centered refers to features that are conceptually centered on the current identity record and typically refers to features that focus on the combination of features from all linked identity records. Distally centered features are those that are conceptually centered on an identity record other than the current one. Since all network-based features have to be expressed ultimately in locally-centered form in order to permit computation of a final fraud score, distally centered features are usually implemented as threshold functions used to detect the presence of some network feature at a linked node. As an example, a distally centered feature could identify the linkage, via a common telephone number, of the current identity record to a cluster of identity records associated with a common address and a high fraud rate. In this case the focus is on the distal cluster of identity records rather than upon the current (local) identity record. A descriptive listing of an exemplary set of network-based features is set forth in Table II.

TABLE II

| Name | Definition | Note |
|---|---|---|
| Num_bad_ssn_linked | Number of records matched with the bad SSN | |
| Num_name_match | Number of records matched with the name | can be used to normalize num_name_match_only |
| Num_ssn_match | Number of records matched with the SSN | can be used to normalize num_ssn_match_only |
| Num_name_match_only | Number of records matched with only the name | same name different all other keys |
| Num_ssn_match_only | Number of records matched with only the SSN | same SSN different all other keys |
| Num_name_uniq | Number of unique names matched | linked by any other keys |

The amount of data necessary to be retained within the historical identity record database 316 varies among different network-based features. All network-based features within a single "link" of the current identity record may be implemented without intermediate storage. The computation of functions of a larger neighborhood require the definition of multiple levels of functions (such as the functions $f$ and g described previously), as well as the storage of the output of each function except the last one. However, efficiency considerations may dictate the caching of results beyond strict necessity, especially if such results would have naturally been computed when the related identity records were first encountered.

Propagation of Suspicion

In certain cases it may be useful for a network variable to be aware of whether a particular linked identity record actually resulted in fraud, or had been marked by one of the more timely but less accurate fraud indicators described above (e.g., early high balance). Accordingly, information relating to this type of identity record status will often be cached for use by the network variable. However, network relationships among known fraud indicators should be evaluated very carefully, since the incidence of fraud associated with application for consumer accounts has been found to be sufficiently high that virtually every application is connected to known fraud by a surprisingly small number of links.

It is observed that propagation of suspicion throughout a network of linked identity records of the present invention is necessarily causal, and therefore may propagate only in the direction of past identity records. Importantly, the propagation of suspicion can be implemented as a single pass algorithm in which each identity record is examined only once. This system characteristic permits scaling to commercially-required sizes and throughput rates.

Time-Based Features

Each time-based nodal feature may be utilized in a network context in order to create temporal network-based features. In particular, this usage gives rise to temporal network-based features, also termed "velocity variables". Each such feature consists of a number of identity records which have existed for less than a predetermined period of time (t) and which are linked by a particular characteristic. All network-based features which are premised upon counting the number of identity records satisfying some predefined criteria may be expressed as velocity variables for very large values of t. Velocity variables are primarily useful for the detection of fraud patterns before the high-coverage fraud indicators of the type described in Table I have had time to stabilize. For example, consider the case in which various higher-accuracy fraud indicators (e.g., "2-payments-missed") have had insufficient time to mature and in which low fraud scores were assigned to various earlier identity records linked to one or more current identity records. Accordingly, the current identity record under consideration fails to show links to known fraud indicators. In this case velocity variables may be helpful by identifying an anomalous pattern of linkage to recent non-fraud identity records. However, once the high-coverage, high-accuracy indicators (e.g., the 2-payments-missed indicator) have matured, linkage to known fraud will tend to make velocity variables superfluous. This consideration bounds the typical maximum useful time for velocity indicators to the minimum time required for stabilization of the high reliability fraud indicators.

Small Diameter Graphical Pattern Matching

In the computation of network-based features, it is possible to propagate values more than one step at a time. In fact, values may be propagated inward to the new identity record from as large a sub-graph of related identity records as may be feasibly extracted at a given time. At least two types of consequences accrue from this propagation characteristic. First, the scope of data that must be kept in intermediate values for the detection of certain kinds of patterns can be decreased. Second, the range of patterns that can be detected without any intermediate storage whatsoever is substantially increased. However, it is observed that the feasible range for such increased radius of direct search is generally limited by the exponential increase in the cost of conducting the search. Specifically, the cost of retrieving identity records related to the current identity record by more than two or three intervening links typically becomes economically infeasible, thereby resulting in detection of only those patterns which may be ascertained by propagating intermediate values.

Fuzzy Cluster Size Spectra

One of the simplest network metrics contemplated by the invention involves examination of a set of related identity records to determine how many unique versions of certain identity information exist in the set. One way this may be effected is by performing agglomerative clustering with respect to the values of one of these identity fields. Specifically, this is performed by using progressively more liberal thresholds in determining whether these identity fields have the same (fuzzy) value. If the values are highly distinct, the number of clusters will be approximately the same as the number of related identity records until the threshold is so liberal that all identity records collapse into a single cluster. If the values are predominantly approximately the same, the number of clusters will collapse to a very small number for even relatively strict matching thresholds. The threshold values, the number of thresholds and the comparison operation may be tuned to obtain the best fraud detection performance. In the exemplary embodiment the identity-related characteristics which have been found to be most interesting for this sort of comparison are name, address and social security number, since these characteristics are all subject to manipulation by fraud artists. Agglomerative clustering is generally described in, for example, *Finding Groups in Data: An Introduction to Cluster Analysis*, Leonard Kaufman, Peter J. Rousseeuw, ISBN: 0-471-87876-6, J W Wiley, 1990.

One convenient metric for approximate equality of strings such as names, addresses and social security numbers is n-gram matching. Consistent with this method, strings to be compared are broken down into all overlapping short substrings of a particular length (typically approximately three characters). These substrings are usually weighted by their frequency of occurrence in typical strings. Match credit is given for common substrings and penalties assessed for substrings that are found in only one of the strings being compared. This method of n-gram matching can be made to approximate the results of edit distance metrics also known as Levenshtein metrics (see, e.g., Dictionary of Algorithms and Data Structures, http://www.nist.gov/dads/), but edit distance is typically much more expensive to compute than n-gram matches.

In the exemplary embodiment the relative number of related identity records within the clusters associated with a set of progressively more liberal clustering thresholds may be considered in conjunction with other feature variables in order to determine a likelihood of fraud. In addition, the difference or ratio of different cluster sizes may also be utilized in detecting evidence of deliberate manipulation of various characteristics of the related identity records. For example, a dramatic change in cluster size as the clustering threshold is expanded is often indicative of such deliberate manipulation. This is because the typically small, gradual changes made to identity records which have been deliberately manipulated will often suddenly cause the modified records to be "collapsed" into a single cluster once the clustering threshold has been sufficiently liberalized to encompass the modifications.

Figure 6:
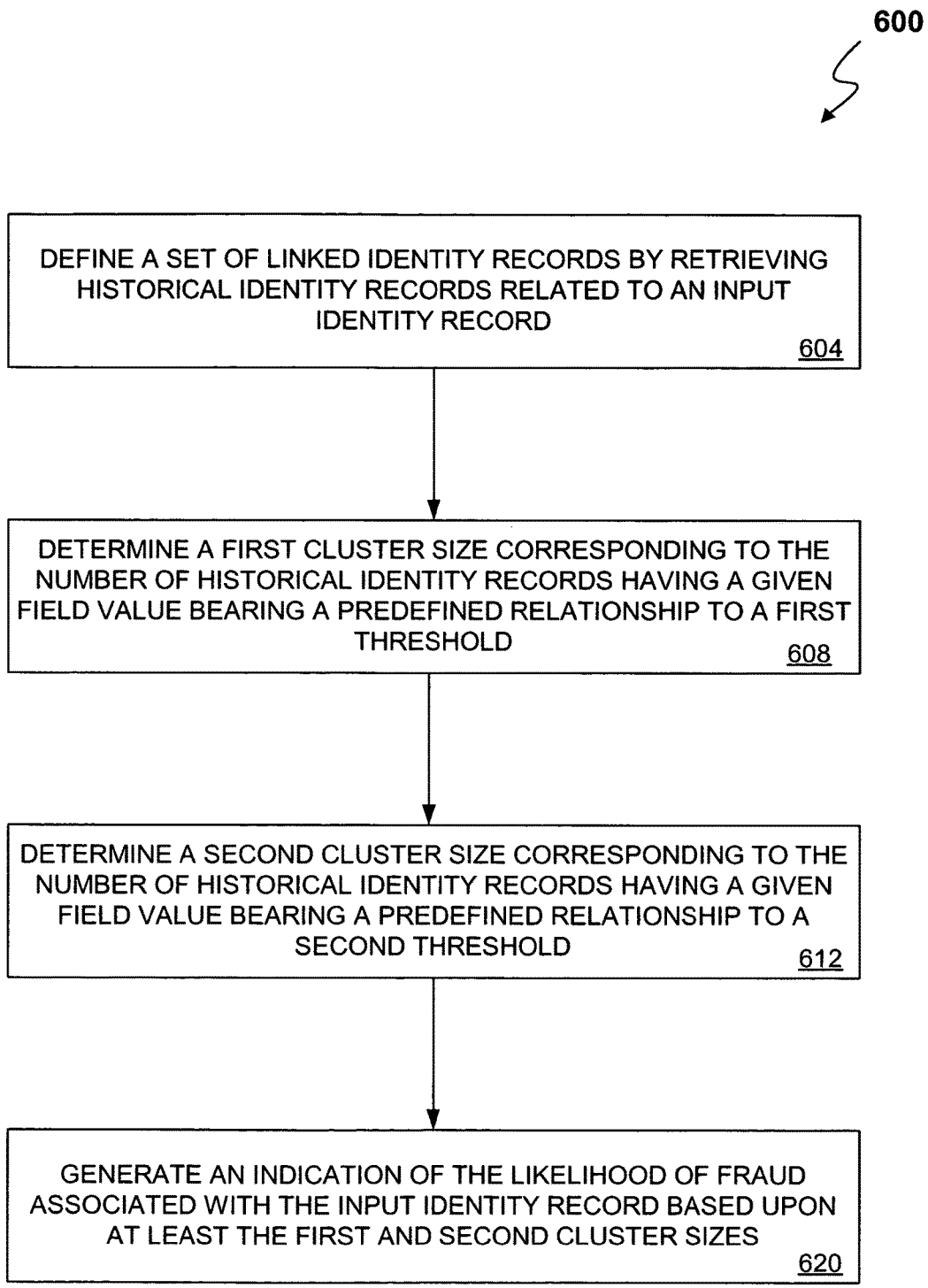
FIG. 6 depicts a flowchart representative of a fraud detection technique of the present invention which is premised upon evaluating the relative sizes of fuzzy clusters of related identity records.

FIG. 6 depicts a flowchart representative of a fraud detection technique 600 of the present invention which is premised upon evaluating the relative sizes of fuzzy clusters of related identity records. The representation of FIG. 6 assumes that an input identity record has been previously selected and that it is desired to determine a likelihood of fraud associated with such input identity record. A set of linked identity records is then defined by retrieving historical identity records related to the input identity record (step 604). A first number, or "cluster size", of the linked identity records which have values of a selected identity field bearing a predefined relationship to a first threshold are then determined (step 608). At least a second number of the linked identity records having values of the selected identity field bearing a predefined relationship to a second threshold are also determined (step 612). In general, additional cluster sizes will also be computed by gradually increasing the applicable threshold. An indication of the likelihood of fraud associated with the input identity record is then generated by comparing or otherwise evaluating the cluster sizes associated with each threshold (step 620). For example, in one embodiment each of the cluster sizes is compared to a total number of the historical identity records included within the set linked identity records. In other embodiments differences between the various cluster sizes are computed and analyzed. Similarly, estimating a likelihood of fraud may entail determining ratios between ones of the cluster sizes.

Meta Features

Meta-features comprise the functional combination of other features, such as nodal features and network-based features. There are several reasons to utilize meta-features within the fraud detection model of the invention. One such reason is to incorporate non-linearity into fraud detection modeling structures which would otherwise use linear decision surfaces. Another reason is to provide scaling of variables in a way that is more natural to the interpretation of the variables. For example, it is generally easier to interpret probabilities after transformation by a logarithm.

In certain embodiments of the invention the incorporation of non-linearity into a fraud detection model is accomplished in a generic fashion by initially introducing all second-order combinations of variables as well as the log transformation of all variables. An advanced technique such as SVM's or ridge regression is then used to determine which nonlinearities are useful and which are superfluous.

Cross-Check Features

Cross-check features are an important class of meta-feature is in which two or more other features are examined for compatibility. The comparison of area and zip codes for geographic compatibility provides an example of such a cross-check feature. Another commonly used cross-check feature results from the comparison of birth date and social security number issue year.

Functional and Table-Based Features

One useful class of meta-features is the set that may be defined based on simple operations involving table lookup and a reasonably small collection of mathematical operations. For instance, isMobileHomePhone*isMobileWorkPhone is a feature that expresses the fact that both home and work phones are mobile numbers. Similarly, nameMatchFraud/nameMatchTotal is a feature which expresses the total number of known fraud identity records that have the same name as a fraction of the total number of identity records that have the same name.

Table lookups are useful for exploding a categorical variable into multiple binary variables. For example, Table III below converts a single categorical variable expressing address type into two binary variables which express the salient characteristics of the address type:

TABLE III

| Address Type | Suspicious? | Expect Multiple Residents |
|---|---|---|
| Apartment | 0 | 1 |
| Office | 1 | 1 |
| Residence | 0 | 0 |
| Mail Drop | 1 | 1 |
| Prison | 1 | 0 |
| Mental Health Facility | 1 | 0 |

Final Generation of Fraud Score and Reason Codes

As mentioned above, the fraud detection technique of the present invention contemplates examination and detection of features inherent within a graphical representation of the links between a current identity record and plural identity records within the historical identity record database 316. The presence or absence and degree of strength of these graphical features is then considered during final fraud detection model evaluation 407 (FIG. 4). This model evaluation typically consists of both score generation and reason code computations. Score computation is generally effected using a non-linear or linear regression model operative to combine a set of inputs comprising the presence/absence and strength of the above graphical features into a single score. The reason code computation typically consists of multiple regression steps combined with threshold comparisons and a logical rule structure that allow the presence or absence of a particular reason code to be determined. The reason codes are intended to aid a fraud investigator in confirming the presence or absence of fraud. Several examples of possible reason codes are given in Table IV.

TABLE IV

| Code | Description |
|---|---|
| 007 | No Anomalies detected |
| 040 | Statistical pattern OK |
| 131 | Address Suspicious - Manipulation Possible |
| 160 | Address is commercial address |
| 161 | Address is Non-residential |
| 165 | Address is Correctional Facility |

The present invention also contemplates that potential frauds can be predicted on the basis of the pattern features inherent within a graphical representation of the links between a current identity record and plural historical identity records (i.e., "GTAD patterns") in combination with the existence of one or more early indicators of fraud. As was mentioned in the Background of the Invention, potential frauds are often not identified in a sufficiently timely manner by credit grantors. By evaluating early fraud indicators in combination with GTAD patterns, embodiments of the present invention are capable of identifying potential frauds without in a way that does not require that model training be predicated upon knowledge of the prior occurrence of actual frauds (which is generally of critical importance to conventional fraud detection techniques).

A variety of early fraud indicators may be considered either alone or in combination when embodiments of the invention are employed for fraud detection in the manner described above. Such fraud indicators may include, for example, (i) high computed fraud score, (ii) moderate computed fraud score, (iii) early high account balance, (iv) early high account balance with one or more payment missed, (v) early high account balance with n or more payment missed, (vi) case is classified as fraud by investigator following attempted identity verification, and (vii) fraud affidavit received. In general, embodiments of the present invention will be configured to consider these types of fraud indicators to the extent associated with a related historical identity record. When combinations of such fraud indicators are utilized, each indicator may be weighted in accordance with its recency, estimated accuracy and/or predictive strength prior to being considered in combination with the applicable GTAD patterns.

Figure 7:
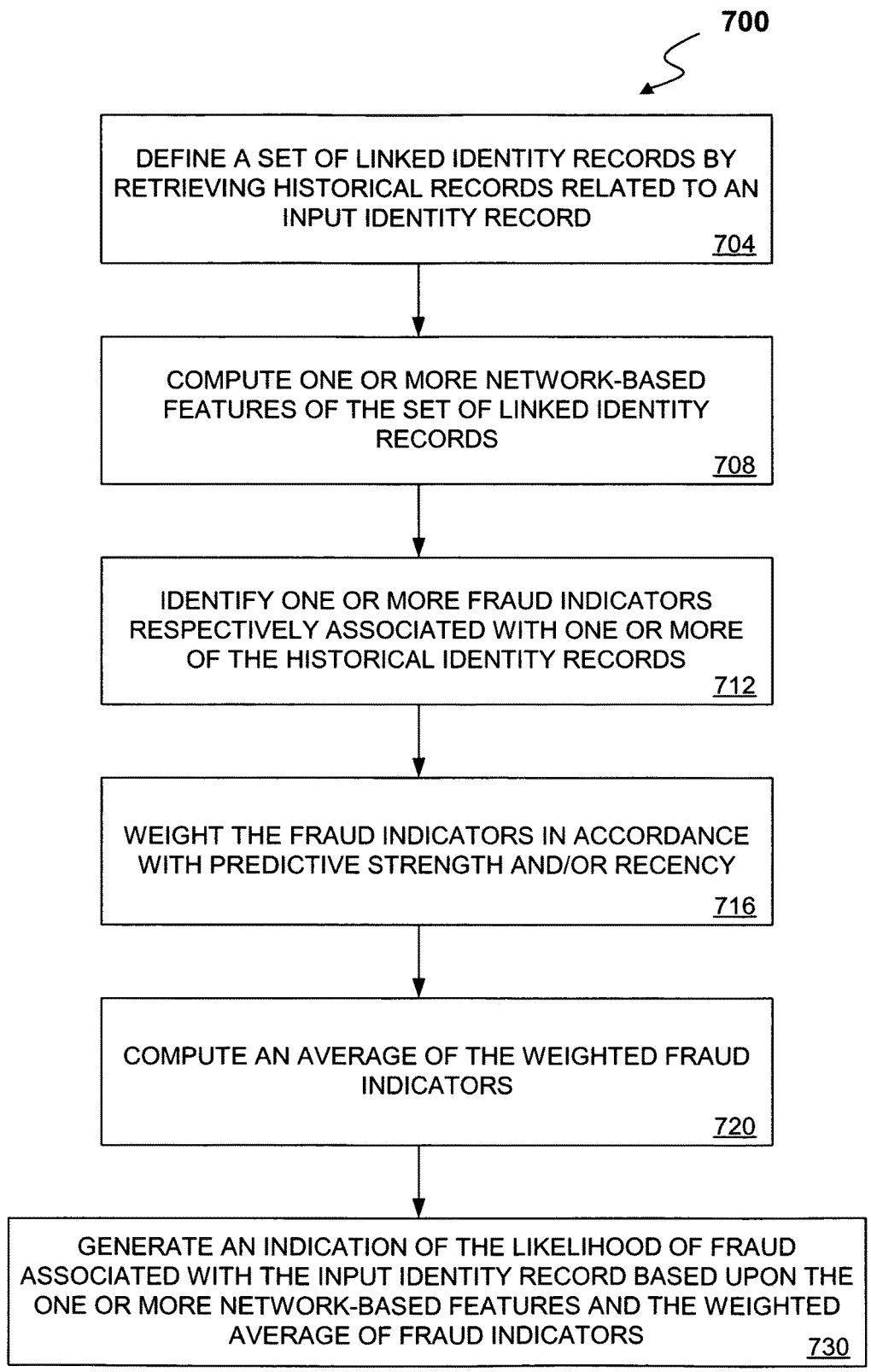
FIG. 7 depicts a flowchart representative of a fraud detection technique of the present invention which is predicated upon consideration of GTAD patterns in combination with one or more early fraud indicators.

Turning now to FIG. 7, there is shown a flowchart representative of a fraud detection technique 700 of the present invention which is predicated upon consideration of GTAD patterns in combination with one or more early fraud indicators. The representation of FIG. 7 assumes that an input identity record has been previously selected and that it is desired to determine a likelihood of fraud associated with such input identity record. At this point historical identity records related to the input identity record are retrieved so as to define a set of linked identity records (step 704). One or more network-based features of the set of linked identity records are then computed (step 708). In addition, one or more fraud indicators respectively associated with one or more of the historical identity records are identified (step 712). When more than a single fraud indicator is identified, ones of the identified indicators may then be respectively weighted in accordance with a predictive strength and/or recency associated with each of the indicators so as to generate a plurality of weighted fraud indicators (step 716). An average of these weighted fraud indicators is then computed (step 720). An indication of the likelihood of fraud associated with the input identity record is then generated based upon the one or more network-based features and the weighted average of fraud indicators (step 730).

Mathematical Underpinnings

The inventive fraud detection system has a number of implementation and scaling properties that stem from the mathematical underpinnings of the system architecture. These properties allow the inventive system to operate in real-time at very high transaction rates while still providing the modeling system with the ability to use of features dependent upon the presence or absences of graphical patterns in a large neighborhood around a current identity record of interest.

Adjacency Matrix

The edgeset of a graph can be described by the so-called adjacency matrix (see, e.g., *Graph Theory*, Frank Harary, Addison-Wesley, 1994). The adjacency matrix is a matrix that has a row and a column for each node of the applicable graph theoretic structure. The element $a_{ij}$ in the $i^{th}$ row and $j^{th}$ column of the adjacency matrix A is generally non-negative and is zero if node i is not connected to node j, and one if node i is connected to node j.

Many mathematical properties of the adjacency matrix have interesting interpretations relative to the graph that the matrix represents. One example is that the number of paths of length n in a graph is $$\sum_i \lambda_i^n$$

where the $\lambda_i$ are the eigenvalues of A.

In many practical implementations of the fraud detection scheme of the invention it is anticipated that the graphical representation of linked identity records will be extremely large. For example, a prototypical implementation of the invention has been developed and used to examine 200 million credit and other applications and to retain nearly 100 million of such applications. As a consequence, the adjacency matrix characterizing the resultant network of linked identity records contained approximately $10^{16}$ elements. If, however, each connection were simply encoded using a single bit, then the resultant matrix would require an impractically large amount of memory space.

Sparsity and Locality for Retrieval

The adjacency matrices generated in connection with many practical implementations of the network of linked identity records contemplated by the inventive fraud detection system will generally be too large to feasibly store explicitly. One well-known method of manipulating very large matrices involves storage of only the non-zero elements of the matrix. In the case of a particular adjacency matrix currently under consideration for use in the inventive system, each row or column of the matrix contains only approximately 10 to 50 non-zero elements, which may yield a reduction in matrix size of up to 7 orders of magnitude. Using a sparse representation, this adjacency matrix requires approximately 4 bytes per non-zero element, which enables the entire matrix to be represented using less than 10 gigabytes.

However, in practical implementations of the inventive fraud detection system it is anticipated that additional auxiliary data will be stored and associated with each node, and possibly also with each edge, in the graphical representation of the network of linked identity records. That is, it is anticipated that auxiliary data other than that merely indicating the presence or absence of an edge between two nodes will be stored. Moreover, this auxiliary data must not only be capable of being stored; rather, all such auxiliary data corresponding to the area of the graph within a certain radius of a given node must be retrieved within a very short period of time.

A simplified example relating to the storage and retrieval of such auxiliary data within the context of the inventive fraud detection system will now be considered. The specific problem considered in this example is that of identifying all of the nodes connected to a center node of a linked identity record graph by any of similarity of name, social security number, address or phone number. It is further desired to find all of the nodes connected to the nodes identified above by social security number, address or phone number and which have some level of suspicious activity. If a conventional sparse matrix storage scheme were employed, the sparse index numbers associated with the original node would likely be read in a single access, but much of the auxiliary data associated with the connected nodes would typically be scattered throughout a very large file. This would require thousands of disk accesses, consuming an unfeasibly large amount of time, in order to obtain a relatively small number of bytes of such auxiliary data.

Decomposition, Permutation to Block-Diagonal or Band-Diagonal Form

Consistent with the invention, decomposition and block-diagonalization of adjacency matrices is performed in order to enable rapid computation of network-based features of linked identity records. As was discussed above, the relative sparsity of adjacency matrices renders them difficult to explore in a computationally feasible manner. Accordingly, the present invention contemplates that the applicable "fuzzy match" adjacency matrix be decomposed into several sub-matrices, each based upon a given identity element (e.g., name, address, social security number, phone number, driver's license number). In addition, localization of the identity-related data stored within these adjacency matrices may be enhanced through block diagonalization of these adjacency matrices. Through application of these techniques, the present invention renders the computation of network-based features computationally feasible. A more detailed description of these techniques is provided immediately below.

The present inventors have recognized that the problem of non-contiguous disk access in a sparse matrix representation of the adjacency matrix and related auxiliary data could in principle be resolved if the adjacency were transitive, that is if node j is connected to nodes i and k, then nodes i and k would be connected (i.e. if $a_{ij} \wedge a_{jk} \Rightarrow a_{sk}$). This is equivalent to saying that the adjacency matrix A is block diagonalizable. A similar property holds if A is only band-diagonalizable because the linking is due to a fuzzy matching. It may be readily appreciated that this will generally not be true within the context of the inventive fraud detection system, since a credit or other consumer application j can quite easily share an address with another application i, and a phone number with yet another application k, and yet have i and k be completely dissimilar. An adjacency matrix will be block diagonalizable whenever the links are due to an exact match on a single key. It will be band diagonalizable if a fuzzy matching operation is used that follows the triangle inequality, but the diagonalization will depend on a more general operation than simple sorting.

The adjacency matrix A can, however, be decomposed into sub-matrices, each of which is block band diagonalizable. In the context of the inventive fraud detection method, each of these sub-matrices corresponds to a kind of relation such as identity of social security name or similarity of address. This decomposition can be written as:

$$A = \sum_i P_i B_i P_i^T$$

where i ranges over the different kind of relations expressed in A, and the $P_i$ are permutation matrices which cause the matrices B to be band-diagonal. This allows the single large, non-contiguous disk access which would otherwise be required to form a sub-matrix of A to instead be effected through a small number of contiguous disk accesses. These contiguous disk accesses form the corresponding sub-matrices of each of the $B_i$, which are then combined to form the required sub-matrix of A.

Implementation

In practice, the contents of A are implicit in the individual historical identity records associated with the nodes of the graph of linked identity records. Accordingly, two identity records can be compared directly in order to determine if they have the same or similar addresses. Moreover, when related identity records are found, only the identity record information need be returned; the details of the connections can be left implicit. These two observations allow the band-diagonalization described in the previous section to be done by taking a file containing all of the historical identity records that define A and the node-associated data, adding a sequence number to each identity record, and duplicating the resultant file containing sequence numbers once for each of the kinds of links in A. Each copy of the identity record file is then sorted according to the field defining a given link, and an index on that field is created.

In this data structure, each separate copy of the data and the links implicit in that data correspond to one of the $B_i$, the indices on each differently sorted copy correspond to the $P_i$ and the sequence numbers (deranged by the sort) correspond to the $P_i^T$. Finding all identity records similar to a given identity record involves searching the indices associated with each of the identity fields of the given identity record, reading a contiguous range of identity records with respect to each such index, and merging the results back together into a single resultant set of similar identity records. The entire data structure is not optimal with respect to space since it maintains multiple copies of the data, but the benefits in terms of speed will generally outweigh the space cost.

Figure 5:
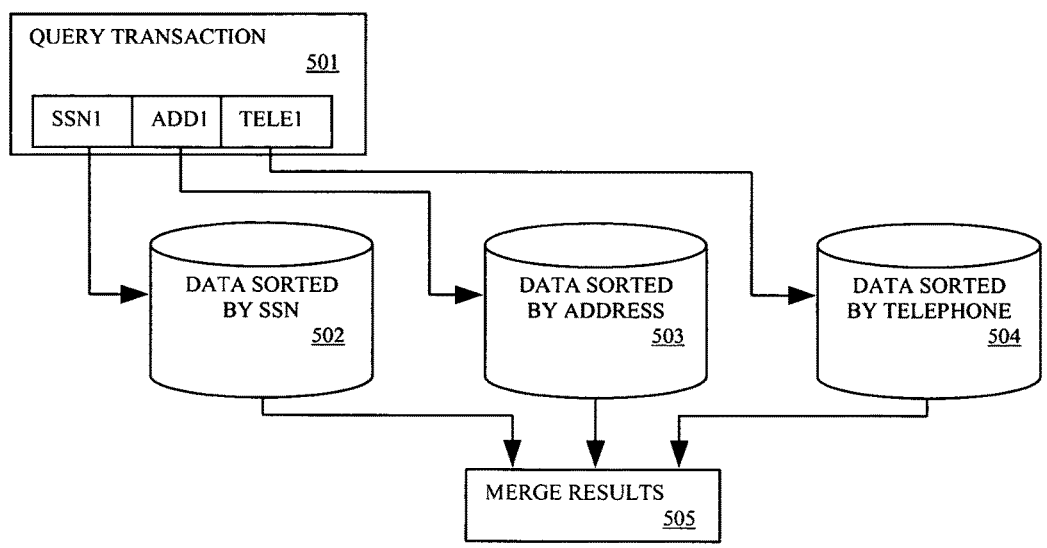
FIG. 5 illustrates a simplified process for identifying all historical identity records within a set of linked historical identity records that are similar to a given identity record.

FIG. 5 illustrates a simplified process for identifying all historical identity records within a set of linked historical identity records that are similar to a given identity record. In the example of FIG. 5, it is contemplated that the set of linked historical identity records are amenable to representation by an adjacency matrix in the manner described above. More specifically, the exemplary process of FIG. 5 contemplates that the adjacency matrix is generated so as to represent a graphical network formed on the basis of such linked records and is decomposed into a set of sub-matrices, each of which is represented as a file indexed as a function of the identity parameter (e.g., telephone number) associated with the applicable sub-matrix. In the example of FIG. 5 these files include a first file 502 indexed as a function of social security number, as second file 503 indexed as a function of address, and a third file 504 indexed as a function of telephone number.

Referring to FIG. 5, an identity record acting as a query 501 is decomposed into individual query components of social security number, address and telephone number. These individual components are then used to respectively access the first file 502, second file 503 and third file 504. The results from each of these files 502-504 are read contiguously starting at an offset found in an index file (not shown) associated with each of the sorted data files 502, 503 and 504. The three results are then merged 505 to form a single result.

Update Methods

The multiple sorted and indexed files described in the previous section provide very high performance retrieval, but tend to be costly to update. Two types of such updates occur within embodiments of the inventive fraud detection system. In the first, new identity records entering the fraud detection center 110 are stored and must be retrieved when subsequent linked identity records are received. Secondly, fraud "tags" associated with previously stored identity records which are found to be suspicious at some later date are updated to reflect the appropriate degree of suspicion.

With respect to updates of the first type described above, it has been found to suffice to retain new identity records entering the fraud detection center 110 within a conventional indexed retrieval database. Newly-received identity records are retained in this manner until the number of identity records so retained is sufficiently large that the amortized cost of merging these retained identity records with existing sorted files is low enough so as to be economically feasible. For example, in certain embodiments it has been found that newly-received identity records can be retained in this manner for up to a week.

Updates of the second type mentioned above, in which the state of a fraud tag associated with the applicable identity records is changed, are handled similarly. In particular, a relatively small conventional database within the fraud detection center 110 may be used to store a set of fraud tags associated with all stored identity records. Fraud tags within this stored set may then "override" the fraud tags nominally associated any identity records in the results 505 obtained from the main database within the fraud detection center 110 before returning these results 505. The cost of this overriding operation may be made arbitrarily small by only keeping recent updates to the fraud tags in the conventional database; older updates can be made to the main database at the same time that new identity records are merged into their proper places. Since the merge process requires copying from the main database, updating the fraud tags at the same time involves no incremental cost.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for determining a likelihood of fraud associated with an input identity record, said method being implemented by a processor which executes instructions of computer readable program code stored within a memory operatively coupled to the processor, said method comprising:

identifying the input identity record, wherein the input identity record comprises one or more identity-related fields associated with a user and is associated with an adjaceny matrix, the adjacency matrix comprising one or more sub-matrices indicating a respective identity-related field of the input identity record;

determining characteristics of the input identity record by examining content of the one or more identity-related fields that is associated with a sub-matrix of the adjacency matrix, wherein determining the characteristics of the input identity record comprises computing one or more nodal features of the input identity record based at least in Dart on the content of the one or more identity-related fields that is associated with the sub-matrix;

retrieving, from the memory, historical identity records related to the input identity record so as to define a set of linked identity records;

computing one or more network-based features of the set of linked identity records based at least in Dart on a decomposition and block diagonalization of one or more adjacency matrices;

generating a non-linear decision model based at least in part on computing the one or more nodal features of the input identity record and computing the one or more network-based features of the set of linked identity records;

determining a fraud score based upon the generated non-linear decision model, wherein the fraud score is based at least in part on a correlation between the one or more nodal features of the input identity record and the one or more network-based features of the set of linked identity records;

generating a reason code based at least in part on determining the fraud score, the reason code comprising an indication of a characteristic of fraud associated with the input identity record;

examining other identity records related to the input identity record subsequent to generating the reason code and issuing a retro-alert with respect to the input identity record when the other identity records are determined to increase a level of fraud-related suspicion attaching to the input identity record, wherein the retro-alert comprises the reason code; and communicating the retro-alert to an administrator associated with the input identity record.

2. The method of claim 1 wherein the examining content is performed without reference to historical identity record data.

3. The method of claim 1 wherein the historical identity records are related to the input identity record by way of a common identity-related parameter.

4. The method of claim 1 wherein at least one of the one or more network based features comprises a graphically-represented statistical summary.

5. The method of claim 1 wherein one of the fields of the input identity record includes a telephone number and wherein at least one of the characteristics of the input identity record relates to whether the phone number is determined to be valid.

6. The method of claim 1 wherein one of the fields of the input identity record includes a social security number and wherein at least one of the characteristics of the input identity record relates to whether the social security number is determined to be valid.

7. The method of claim 1 wherein one of the fields of the input identity record includes a telephone number and wherein at least one of the characteristics of the input identity record relates to whether the telephone number corresponds to a wireless communications unit.

8. The method of claim 1 wherein one of the one or more fields of the input identity record includes an address and wherein at least one of the characteristics of the input identity record relates to whether the address is determined to be valid and deliverable.

9. A method for determining a likelihood of fraud associated with an input identity record, said method being implemented by a processor which executes instructions of computer readable program code stored within a memory operatively coupled to the processor, said method comprising:

identifying the input identity record, wherein the input identity record comprises one or more identity-related fields associated with a user and is associated with an adjacency matrix, the adjacency matrix comprising one or more sub-matrices indicating a respective identity-related field of the input identity record;

determining characteristics of the input identity record by examining content of the one or more identity-related fields that Is associated with a sub-matrix of the adjacency matrix, wherein determining the characteristics of the input identity record comprises computing one or more nodal features of the input identity record based at least in Dart on the content of the one or more identity-related fields that is associated with the sub-matrix;

retrieving, from the memory, historical identity records related to the input identity record so as to define a set of linked identity records;

computing one or more nodal features of the input identity record;

computing one or more network-based features of the set of linked identity records based at least in Dart on a decomposition and block diagonalization of one or more adjacency matrices;

generating a non-linear decision model based at least in part on computing the one or more nodal features of the input identity record and computing the one or more network-based features of the set of linked identity records;

determining a fraud score based upon the generated non-linear decision model, wherein the fraud score is based at least in part on a correlation between the one or more nodal features of the input identity record and the one or more network-based features of the set of linked identity records;

generating a reason code based at least in part on determining the fraud score, the reason code comprising an indication of a characteristic of fraud associated with the input identity record;

examining other identity records related to the input identity record subsequent to generating the reason code and issuing a retro-alert with respect to the input identity record when the other identity records are determined to increase a level of fraud-related suspicion attaching to the input identity record, wherein the retro-alert comprises the reason code; and communicating the retro-alert to an administrator associated with the input identity record.

10. The method of claim 9 wherein one of said one or more fraud indicators comprises an early high balance in an account associated with one of said one or more historical identity records.

11. The method of claim 10 wherein another of said one or more fraud indicators comprises the failure to make a payment in connection with said account prior to a due date.

12. The method of claim 10 wherein another of said one or more fraud, indicators comprises the existence of plural missed monthly payments in connection with said account.

13. The method of claim 9 wherein one of said one or more fraud indicators comprises the classifying, by a third party, of one of said one or more historical identity records as potentially fraudulent.

14. The method of claim 9 wherein one of said one or more fraud indicators comprises the receipt of a fraud affidavit relating to one of said one or more historical identity records.

15. The method of claim 9 wherein one of said one or more fraud indicators comprises the association of a fraud score in excess of a predefined value with one of said one or more historical identity records.

16. The method of claim 9 further including:
weighting ones of said one or more fraud indicators in accordance with a predictive strength associated with each of said indicators so as to generate a plurality of weighted fraud indicators, and
computing a weighted average of said one or more fraud indicators using said plurality of weighted fraud indicators wherein said indication of said likelihood of fraud is based at least in part upon the weighted average.

17. The method of claim 16 wherein said one or more fraud indicators are also weighted in accordance with the relative recency of the corresponding ones of said one or more historical identity records.

18. A method for determining a likelihood of fraud associated with an input identity record, said method being implemented by a processor which executes instructions stored within a memory operatively coupled to the processor, said method comprising:
identifying the input identity record, wherein the input identity record comprises one or more identity-related fields associated with a user and is associated with an adjacency matrix, the adjacency matrix comprising one or more sub-matrices indicating a respective identity-related field of the input identity record;
determining characteristics of the input identity record by examining content of the one or more identity-related fields that is associated with a sub-matrix of the adjacency matrix, wherein determining the characteristics of the input identity record comprises computing one or more nodal features of the input identity record based at least in Dart on the content of the one or more identity-related fields that is associated with the sub-matrix;
retrieving, from the memory, historical identity records related to the input identity record so as to define a set of linked identity records;
computing one or more network-based features of the set of linked identity records by generating a connectivity graph comprised of a plurality of nodes connected by a set of links based at least in Dart on a decomposition and block diagonalization of one or more adjacency matrices, each of the nodes corresponding to at least one of the linked identity records and each of the links being representative of the occurrence of a common characteristic within two or more of the linked identity records;
generating a non-linear decision model based at least in part on computing the one or more nodal features of the input identity record and computing the one or more network-based features of the set of linked identity records;
synthesizing, from the connectivity graph, one or more variables relating to the network-based features;
determining a fraud score based upon the generated non-linear decision model, wherein the fraud score is based at least in part on a correlation between the one or more nodal features of the input identity record and the one or more network-based features of the set of linked identity records;

generating a reason code based at least in part on determining the fraud score, the reason code comprising an indication of a characteristic of fraud associated with the input identity record;
examining other identity records related to the input identity record subsequent to generating the reason code and issuing a retro-alert with respect to the input identity record when the other identity records are determined to increase a level of fraud-related suspicion attaching to the input identity record, wherein the retro-alert comprises the reason code; and
communicating the retro-alert to an administrator associated with the input identity record.

19. The method of claim 18 wherein the examining content is performed without reference to historical identity record data.

20. The method of claim 18 wherein the historical identity records are related to the input identity record by way of associated identity-related parameters.

21. The method of claim 18, wherein at least one of the one or more network-based features comprises a graphically-represented statistical summary.

22. The method of claim 18 wherein one of the fields of the input identity record includes a telephone number and wherein at least one of the characteristics of the input identity record relates to whether the phone number is determined to be valid.

23. The method of claim 18 wherein one of the fields of the input identity record includes a social security number and wherein at least one of the characteristics of the input identity record relates to whether the social security number is determined to be valid.

24. The method of claim 18 wherein one of the fields of the input identity record includes a telephone number and wherein at least one of the characteristics of the input identity record relates to whether the telephone number corresponds to a wireless communications unit.

25. The method of claim 18 wherein one of the one or more fields of the input identity record includes an address and wherein at least one of the characteristics of the input identity record relates to whether the address is determined to be valid and deliverable.

26. A computer-usable medium having computer readable program code physically embodied therein for execution by a processor to perform a method for determining a likelihood of fraud associated with an input identity record, said method comprising:
identifying the input identity record, wherein the input identity record comprises one or more identity-related fields associated with a user and is associated with an adjacency matrix, the adjacency matrix comprising one or more sub-matrices indicating a respective identity-related field of the input identity record;
determining characteristics of the input identity record by examining content of the one or more identity-related fields that is associated with a sub-matrix of the adjacency matrix, wherein determining the characteristics of the input identity record comprises computing one or more nodal features of the input identity record based at least in Dart on the content of the one or more identity-related fields that is associated with the sub-matrix;
retrieving, from the memory, historical identity records related to the input identity record so as to define a set of linked identity records;

computing one or more network-based features of the set of linked identity records based at least in Dart on a decomposition and block diagonalization of one or more adjacency matrices;

generating a non-linear decision model based at least in part on computing the one or more nodal features of the input identity record and computing the one or more network-based features of the set of linked identity records;

synthesizing, from the connectivity graph, one or more variables relating to the network-based features;

determining a fraud score based upon the generated non-linear decision model, wherein the fraud score is based at least in part on a correlation between the one or more nodal features of the input identity record and the one or more network-based features of the set of linked identity records;

generating a reason code based at least in part on determining the fraud score, the reason code comprising an indication of a characteristic of fraud associated with the input identity record;

examining other identity records related to the input identity record subsequent to generating the reason code and issuing a retro-alert with respect to the input identity record when the other identity records are determined to increase a level of fraud-related suspicion attaching to the input identity record, wherein the retro-alert comprises the reason code; and communicating the retro-alert to an administrator associated with the input identity record.

27. The computer-usable medium of claim 26 wherein the examining content is performed without reference to historical identity record data.

28. The computer-usable medium of claim 26 wherein the historical identity records are related to the input identity record by way of associated identity-related parameters.

29. The computer-usable medium of claim 26 wherein at least one of the one or more network-based features comprises a graphically-represented statistical summary.

* * * * *